United States Patent
Del Paggio et al.

(10) Patent No.: US 8,167,976 B2
(45) Date of Patent: May 1, 2012

(54) GAS SEPARATION MEMBRANE SYSTEM AND A METHOD OF PREPARING OR RECONDITIONING AND THE USE THEREOF

(75) Inventors: Alan Anthony Del Paggio, Spring, TX (US); John Charles Saukaitis, Katy, TX (US)

(73) Assignee: Shell Oil Company, Houston, TX (US)

( * ) Notice: Subject to any disclaimer, the term of this patent is extended or adjusted under 35 U.S.C. 154(b) by 712 days.

(21) Appl. No.: 12/032,894

(22) Filed: Feb. 18, 2008

(65) Prior Publication Data

US 2009/0120287 A1 May 14, 2009

Related U.S. Application Data

(60) Provisional application No. 60/890,722, filed on Feb. 20, 2007.

(51) Int. Cl.
*B01D 53/22* (2006.01)
(52) U.S. Cl. ............... 95/55; 95/43; 95/45; 96/4; 96/11
(58) Field of Classification Search ............... 95/43, 45, 95/55; 96/4, 11
See application file for complete search history.

(56) References Cited

U.S. PATENT DOCUMENTS

| | | | | |
|---|---|---|---|---|
| 6,152,987 | A | 11/2000 | Ma et al. | 95/56 |
| 6,296,899 | B1 * | 10/2001 | Iizuka | 427/142 |
| 6,315,820 | B1 * | 11/2001 | Saloka et al. | 96/11 |
| 7,531,215 | B2 * | 5/2009 | Apte et al. | 427/269 |
| 2004/0237780 | A1 | 12/2004 | Ma et al. | 95/55 |
| 2004/0244583 | A1 | 12/2004 | Ma et al. | 95/55 |
| 2004/0244589 | A1 * | 12/2004 | Bossard et al. | 96/11 |
| 2004/0244590 | A1 | 12/2004 | Ma et al. | 96/11 |
| 2006/0016332 | A1 | 1/2006 | Ma et al. | 95/55 |
| 2006/0115643 | A1 * | 6/2006 | Noda et al. | 428/312.8 |
| 2007/0256562 | A1 * | 11/2007 | Routkevitch et al. | 96/11 |

FOREIGN PATENT DOCUMENTS

| | | |
|---|---|---|
| JP | 2008086910 | 4/2008 |
| WO | WO2004098751 | 11/2004 |
| WO | WO2006034103 | 3/2006 |

OTHER PUBLICATIONS

Zipperian, "Silicon Carbide Abrasive Grinding," Pace Technologies, Quality Matters Newsletter, Nov. 2002, vol. 1, Issue 2, page number unknown.*

* cited by examiner

*Primary Examiner* — Jason M Greene
*Assistant Examiner* — Anthony Shumate
(74) *Attorney, Agent, or Firm* — Charles W. Stewart

(57) ABSTRACT

A gas separation membrane system and a method of preparing such gas separation membrane system by providing a porous support upon which is supported a membrane layer comprising a first gas-selective material and having a membrane thickness and removing therefrom a substantial portion of the first gas-selective material from the membrane layer by the use of an ultra-fine abrasive to thereby provide the membrane layer having a reduced membrane thickness. A second gas-selective material is deposited upon the membrane layer having the reduced membrane thickness to provide an overlayer of the second gas-selective material having an overlayer thickness so as to thereby provide the gas separation membrane system having the membrane layer of the reduced membrane thickness and the overlayer of the overlayer thickness.

22 Claims, 3 Drawing Sheets

GAS SEPARATION MEMBRANE SYSTEM AND A METHOD OF PREPARING OR RECONDITIONING AND THE USE THEREOF

CROSS-REFERENCE TO RELATED APPLICATIONS

This application claims the benefit of U.S. Provisional Application No. 60/890,722 filed Feb. 20, 2007, the entire disclosure of which is hereby incorporated by reference.

FIELD OF THE INVENTION

This invention relates to a method of preparing or reconditioning a gas separation membrane system, the gas separation membrane system itself, and the use thereof.

BACKGROUND OF THE INVENTION

Composite gas separation modules are commonly used to selectively separate a particular gas from a gas mixture. These composite gas separation modules may be made of a variety of materials, including, for example, polymers and metallic composites. While these composite gas separation modules can provide effective and cost efficient alternatives for the separation of gases at low temperature process conditions, they often are unsuitable for use in high temperature and pressure gas separation processing.

Certain types of gas separation modules are disclosed in the prior art that are intended for use in high temperature gas separation applications and that have structures consisting of a selective gas permeable metallic membrane mounted on the surface of a porous substrate. For instance, US Patent Publication 2004/0237780 discloses a gas separation module for the selective separation of hydrogen gas from a hydrogen gas-containing gaseous stream. It is taught therein that the gas separation module is made by first depositing a gas-selective metal onto a porous substrate followed by abrading the resultant coated substrate and, thereafter, depositing a second layer of a gas-selective metal upon the coated polished porous substrate. Techniques mentioned for depositing the gas-selective metal include electroless plating, thermal deposition, chemical vapor deposition, electroplating, spray deposition, sputter coating, e-beam evaporation, ion beam evaporation and spray pyrolysis. The intermediate step of abrading or polishing of the coated substrate is used to remove unfavorable morphologies from the surface of the coated substrate, but there is no suggestion that such abrading may be used for the purpose of removing a substantial portion of the first deposited material to provide a thinner dense gas selective membrane. And, moreover, this publication fails to recognize the problems associated with the use of abrasion media of large particle size and how such use of large particle size media restricts the ability to provide for thinner membrane thicknesses due to the scratch depths caused by the abrasion media.

Also, while US 2004/0237780 discloses a method of manufacturing a gas separation module that includes a dense gas-selective membrane that is supported on a substrate, it fails to teach a cost effective method for reconditioning or repairing an already manufactured gas separation module when the membrane thereof has a defect such that it is no longer, or was never, gas tight so as to prevent leaks of undesired gases through the membrane during its use. The teachings of the publication, instead, are directed to a method of manufacturing a new or an original gas separation module.

It is desirable to provide a composite gas separation module or system that has a gas-selective membrane with a thickness that is as thin as is possible so as to enhance the gas permeation rate (gas flux) therethrough and to minimize the amount of costly metallic materials, e.g. palladium, silver and gold, that are used in their manufacture. The gas-selective membrane should be gas tight or otherwise free of defects that cause leaks of gases that are ordinarily not permeable through the gas-selective membrane material.

It is further desirable to provide a method of reconditioning a composite gas separation system that is defective or through use has become defective or damaged so that the gas-selective membrane thereof is no longer gas tight.

It is also desirable to provide a method of making a composite gas separation system that has an exceptionally thin gas-selective membrane thickness that is gas tight.

BRIEF SUMMARY OF THE INVENTION

Accordingly, provided is a method of preparing a gas separation membrane system, wherein said method comprises: providing a porous support upon which is supported a membrane layer comprising a first gas-selective material and having a membrane thickness; removing a substantial portion of said first gas-selective material from said membrane layer by the use of an ultra-fine abrasive to thereby provide said membrane layer having a reduced membrane thickness; and depositing upon said membrane layer having said reduced membrane thickness an overlayer comprising a second gas-selective material and having an overlayer thickness so as to thereby provide said gas separation membrane system having said membrane layer of said reduced membrane thickness and said overlayer of said overlayer thickness.

The inventive gas separation membrane system, comprises: a porous support upon which is supported a membrane layer of a first gas-selective material with a substantial portion thereof having been removed therefrom by the use of an ultra-fine abrasive to thereby provide said membrane layer having a reduced membrane thickness, wherein said membrane layer is overlaid with an overlayer of a second gas-selective material, and wherein said overlayer has an overlayer thickness so as to thereby provide said gas separation membrane system having said membrane layer of said reduced membrane thickness and said overlayer of said overlayer thickness.

The inventive gas separation membrane system may be used in a process for the separation of hydrogen from a hydrogen-containing gas stream, wherein said process comprises: passing said hydrogen-containing gas stream over a gas separation membrane system, comprising a porous support upon which is supported a membrane layer of a first gas-selective material with a substantial portion thereof having been removed therefrom by the use of an ultra-fine abrasive to thereby provide said membrane layer having a reduced membrane thickness, wherein said membrane layer is overlaid with an overlayer of a second gas-selective material, and wherein said overlayer has an overlayer thickness, under temperature and pressure conditions such that hydrogen from said hydrogen-containing gas stream selectively passes through said gas separation membrane system; and recovering the thus separated hydrogen.

DETAILED DESCRIPTION OF THE INVENTION

Figure 1A:
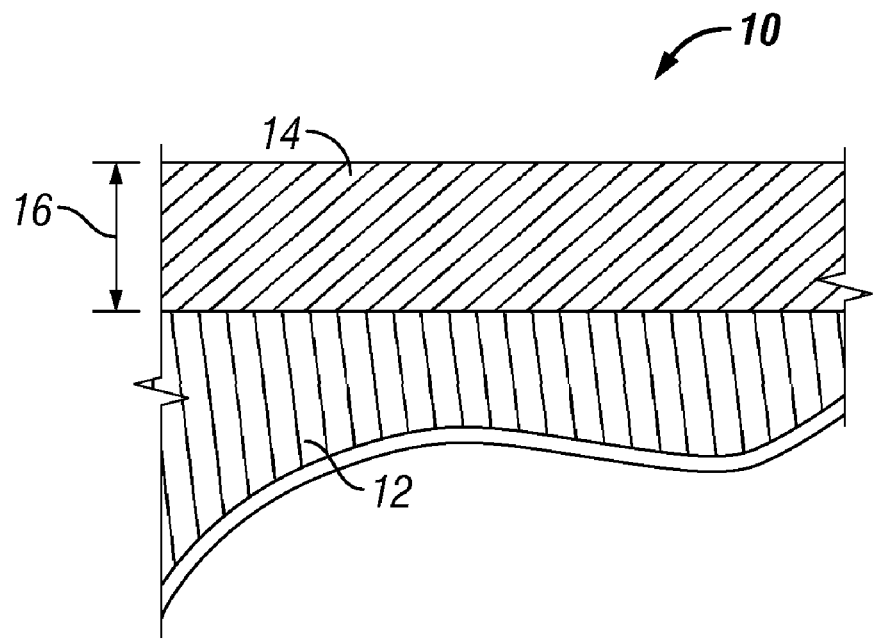
FIG. 1A presents a cross-section of a gas separation membrane system that includes a porous support upon which is supported a membrane layer of a first gas-selective material.

The invention relates to a method of preparing, or reconditioning, or both, a gas separation membrane system, a gas separation membrane system and its use. The invention further relates to an economically advantageous method of manufacturing a gas separation membrane system having an exceptionally thin membrane layer of at least one gas-selective material, the resulting gas separation membrane system from such manufacturing method and the use thereof.

Many of the materials and components used in the manufacture of gas separation membrane systems can be exceptionally expensive. For instance, the noble metals, such as palladium, gold and silver, used in the formation of a gas-selective membrane layer of a gas separation membrane system are costly, and, therefore, it can be economically advantageous to minimize the amount of noble metal that is used in making a gas separation membrane system. Also, in many instances, the porous support that is used in the preparation of a gas separation membrane system to support the gas-selective membrane layer can be exceedingly expensive, with the cost of the porous support material sometimes exceeding even that of the precious metal of the gas-selective membrane layer.

Due to the high cost of gas-selective precious metal, there is an advantage to minimizing the amount thereof used in the preparation of a gas separation membrane system. Also, there can be enormous economic advantages to being able to recondition or rebuild a gas separation membrane system that has been in use but has become defective as a result of such use, or to recondition or rebuild a gas separation membrane system yielded from a manufacturing process but having a manufacturing defect that renders it unusable.

In view of the above, one embodiment of the invention, thus, relates to a reconditioned gas separation membrane system and a method of making such a reconditioned gas separation membrane system. This reconditioned gas separation membrane system comprises a porous support upon which is a membrane layer of a first gas-selective material with a substantial portion thereof having been removed therefrom by the use of an ultra-fine abrasive to thereby provide the membrane layer having a reduced membrane thickness and wherein the membrane layer is overlaid with an overlayer of a second gas-selective material with the overlayer having an overlayer thickness. This reconditioned gas separation membrane system, further, can be manufactured by reconditioning an already manufactured gas separation membrane system that has been in use and which has developed a defect or leak, or one that is freshly manufactured but has an undesirable defect or leak requiring reworking of the gas separation membrane system. The ability to recondition or rebuild an already manufactured gas separation membrane system, as opposed to manufacturing one from scratch, can provide huge cost benefits due to the savings that result from the reuse of the costly porous support and gas-selective materials.

The inventive reconditioning method starts with an existing gas separation membrane system that is unusable due to, for example, a defect or a leak in its membrane layer. The existing gas separation membrane system that is worked upon generally comprises a porous support upon which is supported a membrane layer that comprises a first gas-selective material. The membrane layer of the existing gas separation membrane system has a membrane thickness.

The porous support upon which the membrane layer rests may include any porous metal material that is suitable for use as a support for the gas-selective material and which is permeable by hydrogen. The porous support may be of any shape or geometry; provided, that, it has a surface that permits the application thereto or deposition thereon of the layer of gas-selective material. Such shapes can include planar or curvilinear sheets of the porous metal material having an undersurface and a top surface that together define a sheet thickness, or the shapes can be tubular, such as, for example, rectangular, square and circular tubular shapes that have an inside surface and an outside surface that together define a wall thickness and with the inside surface of the tubular shape defining a tubular conduit.

The porous metal material can be selected from any of the materials known to those skilled in the art including, but not limited to, the stainless steels, such as, for example, the 301, 304, 305, 316, 317, and 321 series of stainless steels, the HASTELLOY® alloys, for example, HASTELLOY® B-2, C-4, C-22, C-276, G-30, X and others, and the INCONEL® alloys, for example, INCONEL® alloy 600, 625, 690, and 718. The porous metal material, thus, can comprise an alloy that is hydrogen permeable and which comprises iron and chromium. The porous metal material may further comprise an additional alloy metal selected from the group consisting of nickel, manganese, molybdenum and any combination thereof.

One particularly desirable alloy suitable for use as the porous metal material can comprise nickel in an amount in the range of upwardly to about 70 weight percent of the total weight of the alloy and chromium in an amount in the range of from 10 to 30 weight percent of the total weight of the alloy. Another suitable alloy for use as the porous metal material comprises nickel in the range of from 30 to 70 weight percent, chromium in the range of from 12 to 35 weight percent, and molybdenum in the range of from 5 to 30 weight percent, with these weight percents being based on the total weight of the alloy. The Inconel alloys are preferred over other alloys.

The thickness (e.g. wall thickness or sheet thickness as described above), porosity, and pore size distribution of the pores of the porous metal substrate are properties of the porous support selected in order to provide a gas separation membrane system of the invention that has the desired properties and as is required in the manufacture of the gas separation membrane system of the invention. It is understood that, as the thickness of the porous support increases, when it is used in hydrogen separation applications, the hydrogen flux will tend to decrease. The operating conditions, such as pressure, temperature and fluid stream composition, may also impact the hydrogen flux. But, in any event, it is desirable to use a porous support having a reasonably small thickness so as to provide for a high gas flux therethrough. The thickness of the porous substrate for the typical application contemplated hereunder can be in the range of from about 0.1 mm to about 25 mm, but, preferably, the thickness is in the range of from 1 mm to 15 mm, and, more preferably, from 2 mm to 12.5 mm, and, most preferably, from 3 mm to 10 mm.

The porosity of the porous metal substrate can be in the range of from 0.01 to about 1. The term porosity is defined as the proportion of non-solid volume to the total volume (i.e. non-solid and solid) of the porous metal substrate material. A more typical porosity is in the range of from 0.05 to 0.8, and, even, from 0.1 to 0.6.

The pore size distribution of the pores of the porous metal substrate can vary with the median pore diameter of the pores of the porous metal substrate material typically being in the range of from about 0.1 µm to about 50 µm. More typically, the median pore diameter of the pores of the porous metal substrate material is in the range of from 0.1 µm to 25 µm, and, most typically, from 0.1 µm to 15 µm.

The membrane layer that is supported upon a porous support of the gas separation membrane system that is to be reconditioned is formed by the application of the gas-selective material to the surface of the porous support using any suitable method known in the art that provides for the membrane layer having a membrane thickness. Examples of the various prior art gas separation membrane systems that may be reconditioned in accordance with the inventive reconditioning method described in this specification and the methods of their manufacture are described in detail in U.S. Pat. No. 6,152,987; US 2004/0244583; US 2004/0237779; US 2006/0016332; and US 2004/0244590, each of which publication is incorporated herein by reference. Also, the gas separation membrane systems described in U.S. Provisional Patent Applications U.S. 60/864,890 and U.S. 60/864,876, both of which patent applications is incorporated herein by reference, may be reconditioned in accordance with the inventive reconditioning method as described herein.

A gas-selective material, as the term is used herein, is a material that is selectively permeable to a gas when it is in a form of a dense, thin film, and, thus, a dense thin layer of such a material will function so as to selectively allow the passage of a selected gas therethrough while preventing passage of other gases. Possible gas-selective metals include palladium, platinum, gold, silver, rhodium, rhenium, ruthenium, iridium, niobium, and alloys of two or more thereof. In a preferred embodiment of the invention, the gas-selective material is a hydrogen-selective metal such as platinum, palladium, gold, silver and combinations thereof, including alloys. The more preferred gas-selective material is palladium, silver and alloys of palladium and silver. The most preferred gas-selective material is palladium.

The membrane layer of a first gas-selective material is applied to the porous support of the gas separation membrane system by any suitable means or method known to those skilled in the art, such as, for instance, those mentioned and described in the aforementioned patents and patent applications. Possible deposition methods include electroless plating, thermal deposition, chemical vapor deposition, electroplating, spray deposition, sputter coating, e-beam evaporation, ion beam evaporation and spray pyrolysis. A preferred deposition method is electroless plating.

The typical membrane thickness of the membrane layer supported upon a porous support or of a gas separation membrane system to be reconditioned can be in the range of from 1 µm to 50 µm, but for many gas separation applications, a membrane thickness in the upper end of this range may be too thick to provide for a reasonable gas flux that allows for a desired gas separation. And, also, various of the prior art manufacturing methods often provide gas separation membrane systems having membrane layers of gas-selective material that are unacceptably thick such that they provide for unacceptable gas separation capability. Generally, a membrane thickness that is greater than 20 µm is too large to provide for acceptable separation of hydrogen from a gas stream, and, even a membrane thickness greater than 15 µm, or even greater than 10 µm, is not desirable.

As suggested above, one of the advantages provided by the inventive method is that it provides a reliable way of reconditioning or repairing a gas separation membrane system having a membrane layer that has developed a leak and, thus, is no longer gas tight. In the repair of these gas separation membrane systems, the membrane layer thickness is reduced and then overlaid with a thickness of an overlayer of a second gas-selective material with the overlayer having a dimension that is, preferably, less than the sum of the reduced membrane thickness and the overlayer thickness.

Another of the advantages of the inventive methods described herein is that they provide for the consistent manufacture of gas separation membrane systems that have exceptionally thin, gas tight (i.e., dense), membrane layers of gas-selective material supported upon a porous support. In particular, a dense membrane layer can consistently be made to be less than 10 µm, and, typically, the dense membrane layer has a thickness in the range of from 0.001 µm to 9.9 µm, preferably, from 0.01 µm to 9.5 µm, and, most preferably, from 0.1 µm to 9 µm.

To recondition the gas separation membrane system, or otherwise in the preparation of a new gas separation membrane system, a substantial portion of the first gas-selective material is removed from the membrane layer to thereby provide a membrane layer having a reduced membrane thickness. To do this, it is an important aspect of the inventive method that an ultra-fine abrasive is used in at least the final steps of the removal of the substantial portion of the first gas-selective material from the membrane layer. This is important due to the need to subsequently deposit an ultra-thin overlayer of a second gas-selective material upon the membrane layer that has had its thickness reduced by the removing step.

The size of the abrasive particles of the ultra-fine abrasive used to remove the substantial portion of the first gas-selective material of the membrane layer has an effect upon the resulting scratch sizes imposed upon the surface of the membrane layer that has been abraded, and, thus, impacting the amount of second gas-selective material that must be laid down upon its surface in order to form a gas tight membrane. In fact, the problems associated with the use of large particle size abrasives in the formation of ultra-thin membrane layers in the manufacture of gas separation modules are not recognized in the prior art, which, generally, discloses only the use of abrasives that utilize abrasive particles of the larger grit sizes, such as 600-grit, and, then, only for the purpose of removing unfavorable surface morphologies from the surface of a coated porous substrate of a gas separation module.

In the removal step of the inventive method, an abrasive must be used that includes abrading particles small enough so that, after the thickness of the membrane layer is reduced thereby, an ultra-thin and gas tight overlayer of a second gas-selective material may be applied to the membrane layer having the reduced membrane thickness. While a portion of the membrane layer may be removed by abrading or grinding it first with larger abrasive particles in order to more rapidly remove amounts of the first gas-selective material from the membrane layer, it is a critical aspect of the invention that, prior to the application of the overlayer of second gas-selective material, a final polishing or buffing be conducted with an ultra-fine abrasive that utilizes and includes ultra-fine abrasive particles but which excludes larger abrasive particles.

The abrasives suitable for use in removing a portion of the first gas-selective material from the membrane layer of the gas separation membrane system can be selected from any type of abrasive, such as, bonded abrasives, coated abrasives, and loose abrasives, including abrasive particles suspended in a liquid or abrasives contained in a paste. But, the key feature required of such abrasives is that the abrading particles be ultra-fine in size when used in the final polishing or buffing of the membrane layer. An ultra-fine abrasive, as the term is used in this specification, is one composed of abrading particles of grit size 1200 (average diameter of 3 µm) or finer. Thus, the abrading particles of the ultra-fine abrasive should have an average particle diameter in the range of upwardly to 3 µm. In order to provide for the deposition of the thinnest possible overlayer of second gas-selective material upon the membrane layer having the reduced thickness, it is desirable to use as fine of abrading particles as is possible in the final polishing of the membrane layer prior to the application of the overlayer thereto. Thus, it is desirable for the diameters of the abrading particles of the ultra-fine abrasive to be no larger than in the range of from 0.01 µm to 3 µm, preferably, from 0.01 µm to 2 µm, and, most preferably, from 0.01 µm to 1 µm. The grit sizes can range from 1200-grit to 10,000-grit, or finer.

The composition of the abrasive particles of the ultra-fine abrasive is not critical and the abrasive particles may be selected from the natural abrasives, such as, for example, diamond, corundum, emery, and silica, or from the manufactured abrasives, such as, for example, silicon carbide, aluminum oxide (fused, sintered, sol-gel sintered), boron carbide, and cubic boron nitride. Preferred, however, is aluminum oxide.

The amount of the first gas-selective material removed from the membrane layer should be such as to allow thereafter for the deposition of an overlayer of a second gas-selective material such that the sum of the dimensions of the overlayer thickness and the reduced membrane thickness is less than the dimension of the membrane thickness prior to its reduction. Typically, the membrane thickness of the membrane layer prior to its reduction by the removing step will be greater than 80 percent of the sum of the dimensions of the reduced membrane thickness and the overlayer thickness.

One of the advantages of the inventive method described herein is that the removing step allows for the fabrication of a reconditioned gas separation membrane system that includes a gas tight membrane of a gas-selective material (i.e., both the first gas-selective material and second gas-selective material) having a thickness dimension (i.e. the of the reduced membrane thickness and overlayer thickness) of less than 10 µm and, indeed, nothing in the prior art addresses the problems associated with the reconditioning or repairing of damaged or defective gas separation membrane systems in a way so that a gas tight membrane of a first gas-selective material and a second gas-selective material may be deposited upon the porous support so that it has a total thickness dimension of less than 10 µm.

In a preferred embodiment of the invention, the amount of the first gas-selective material removed from the membrane layer is such that the thickness of the membrane layer is reduced from 10 to 90 percent of its original thickness. It is more preferred to remove such a substantial portion of the first gas-selective material from the membrane layer that its reduced membrane thickness is in the range of from 20 to 90 percent of the original membrane thickness, and, most preferred, the amount of the first gas-selective material removed from the membrane layer is such that the reduced membrane thickness is from 30 to 90 percent of the original membrane thickness.

Once the substantial portion of the first gas-selective material is removed from the membrane layer, an amount of a second gas-selective material is deposited onto the membrane layer having the reduced thickness so as to provide a gas separation membrane system having a membrane layer of a reduced membrane thickness and an overlayer of an overlayer thickness. In one embodiment of the invention, the sum of the overlayer thickness and of the reduce membrane thickness is less than 10 µm.

Any suitable means or method known to those skilled in the art may be used to deposit the overlayer of second gas-selective material upon the membrane layer, including, for example, electroless plating, thermal deposition, chemical vapor deposition, electroplating, spray deposition, sputter coating, e-beam evaporation, ion beam evaporation and spray pyrolysis. A preferred deposition method is electroless plating. An example of a suitable electroless plating method for the deposition of the second gas-selective material over the membrane layer is that which is disclosed in Pub. No. US 2006/0016332.

Due to the use of the ultra-fine abrasive in the reduction of the membrane thickness, a very thin and gas tight overlayer of the second gas-selective material may be applied to the surface of the membrane and which has an overlayer thickness of less than 10 µm, preferably, less than 8 µm, and most preferably, less than 5 µm. The lower limit for the overlayer thickness is about 0.001 µm, and, thus, the overlayer thickness can be in the range of from 0.001 µm to 10 µm, preferably, from 0.001 µm to 8 µm, and, most preferably, from 0.001 µm to 5 µm. This can provide a reconditioned gas separation membrane system that includes a membrane layer and an overlayer wherein the sum of the overlayer thickness and the reduced membrane thickness can be in the range of from 0.001 µm to 9.9 µm, but, preferably, from 0.01 µm to 9.5 µm, and, most preferably, from 0.1 µm to 9 µm.

The inventive gas separation membrane may be used in the selective separation of a select gas from a gas mixture. The gas separation membrane is particularly useful in the separation of hydrogen from a hydrogen-containing gas stream, especially, in high temperature applications. One example of a high temperature application in which the inventive gas separation membrane may be used is in the steam reforming of a hydrocarbon, such as methane, to yield carbon monoxide and hydrogen, followed by the reaction of the yielded carbon monoxide with water in a so-called water-gas shift reaction to yield carbon dioxide and hydrogen. These catalytic reactions are equilibrium type reactions, and the inventive gas separation membrane is useful in the simultaneous separation of the yielded hydrogen while conducting the reactions in order to enhance the equilibrium conditions to favor hydrogen yield. The reaction conditions under which the reactions are simultaneously conducted can include a reaction temperature in the range of from 400° C. to 600° C. and a reaction pressure in the range of from 1 to 30 bars.

As already noted, the inventive gas separation membrane can be used in a wide variety of applications that involve the separation of hydrogen from gas streams that comprise other gases, for example, those selected from the group of gases consisting of carbon dioxide, water, methane or mixtures thereof. In such applications, the temperature conditions can be in the range upwardly to 600° C., for instance, in the range of from 100° C. to 600° C., and the pressure conditions can be in the range upwardly to 50 bar, for instance, in the range of from 1 to 40 bar.

Reference is now made to the FIG.s, which are provided to help illustrate certain aspects of the invention.

Depicted in FIG. 1A is a cross-section of a gas separation membrane system 10 that includes a porous support 12 (shown as a partial thickness) upon which is supported a membrane layer 14 comprising a first gas-selective material. The membrane layer 14 has a membrane thickness 16.

Figure 1B:
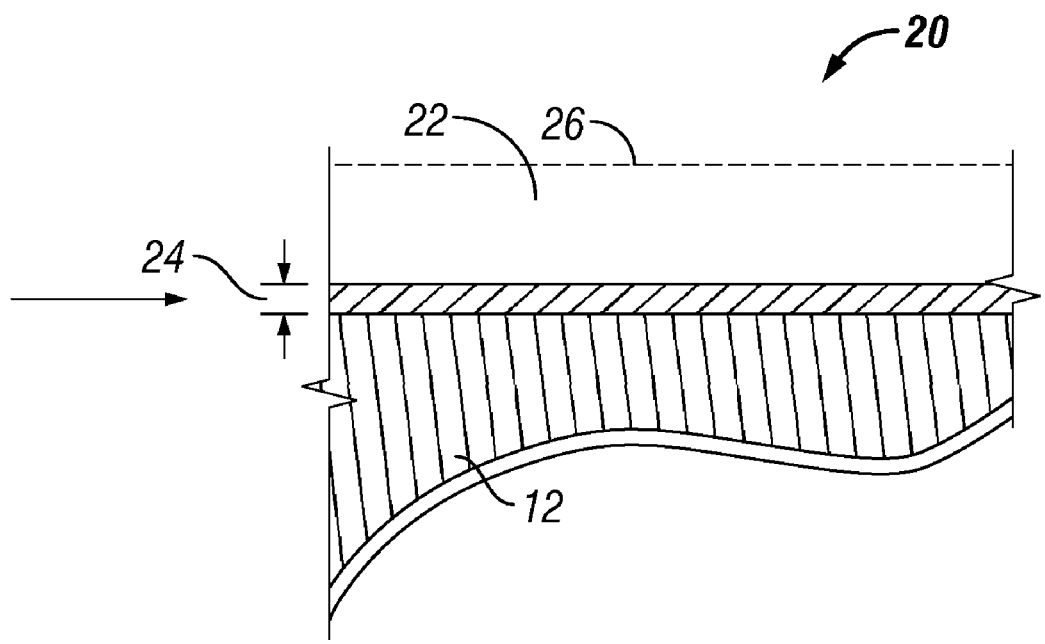
FIG. 1B presents a cross-section of the gas separation membrane system of FIG. 1A after having removed therefrom a significant portion of the first gas-selective material of the membrane layer to thereby provide for a membrane layer of a reduced membrane thickness.

FIG. 1B depicts a cross-section of the gas separation membrane system 20 after a substantial portion 22 of the first gas-selective material has been removed from the membrane layer 14 by the use of an ultra-fine abrasive to thereby provide the membrane layer having a reduced thickness 24. The broken line 26 represents the outer boundary of the membrane layer 14 prior to the removal of the substantial portion 22 (shown as a void area) of the first gas-selective material from the membrane layer 14. The remaining first gas-selective material not removed from the membrane layer 14 is shown as having a reduced thickness 24.

Figure 1C:
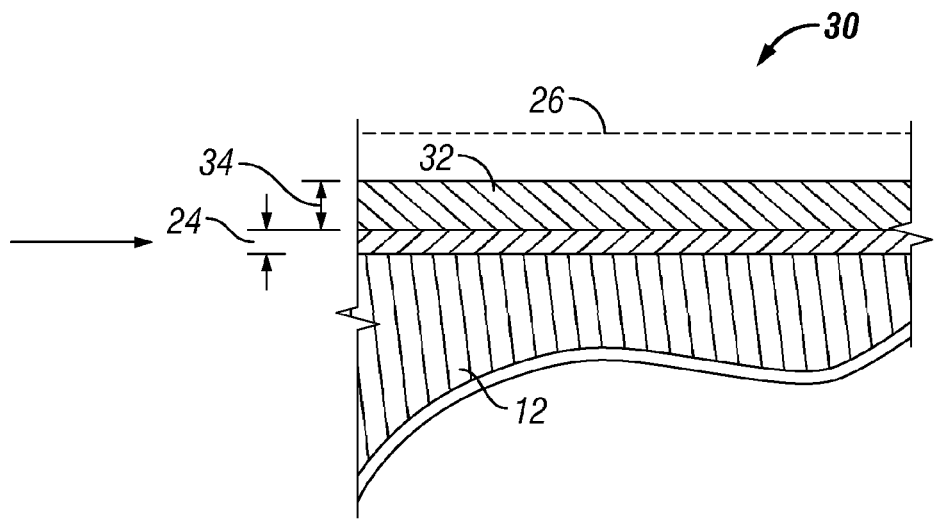
FIG. 1C presents a cross-section of the gas separation membrane system after applying or depositing an overlayer of a second gas-selective material upon the surface of the membrane layer of the gas separation system of FIG. 1B.

Depicted in FIG. 1C is a cross-section of gas separation membrane system 30 after the application or deposition of an overlayer 32 of a second gas-selective material upon the membrane layer having a reduced thickness 24. The overlayer 32 has an overlayer thickness 34, and, preferably, the sum of the reduced thickness 24 and the overlayer thickness 34 is less than the membrane thickness 16.

Figure 2:
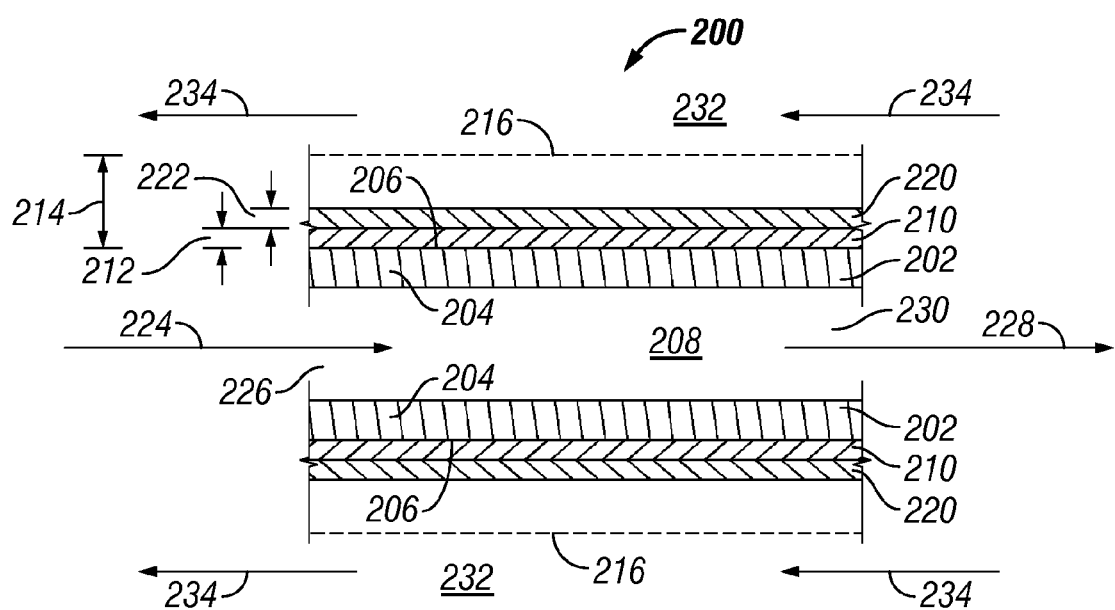
FIG. 2 depicts a cross-section of a tubular gas separation membrane system of the invention used in a process for the selective separation of a gas component from a gas mixture.

Reference is now made to FIG. 2, which depicts a cross-section of a tubular gas separation membrane system 200 of the inventive gas separation membrane system used in a process for the selective separation of a gas component from a gas mixture. The tubular gas separation membrane system 200 includes a porous support 202 having an inside surface 204 and an outside surface 206 which define a conduit 208. Supported upon the porous support 202 is a membrane layer 210 comprising a first gas-selective material having a reduced membrane thickness 212. The membrane layer 210 was prepared by the deposition of the first gas-selective material upon the porous support 202 of such an amount as to provide a membrane thickness 214 extending out from the porous support 202 to the location as depicted by the broken line 216 and, thereafter, removing a substantial portion of the first gas-selective material therefrom by the use of an ultra-fine abrasive to thereby provide the membrane layer 210 having the reduced membrane thickness 212. A second gas-selective material is deposited upon the membrane layer 210 having the reduced membrane thickness 212 as an overlayer 220. The overlayer 220 has an overlayer thickness 222, and together with the membrane layer 210 having a reduced membrane thickness 212 and the porous support 202, the combination provides for the tubular gas separation membrane system 200.

One method of using the tubular gas separation membrane system 200 can be for the selective separation of hydrogen gas from a gas mixture, comprising hydrogen gas. In this method, the gas mixture 224 is introduced into the inlet end 226 of conduit 208 from which an effluent gas 228 is removed from the outlet end 230 of conduit 208. As the gas mixture passes through conduit 208, the hydrogen gas contained in the gas mixture selectively passes through and across the gas separation membrane system 200 to the outside zone 232 that is outside of the overlayer 220, the membrane layer 210 and the porous support 202 where the selectively separated hydrogen 234 passes from the outside zone 232, preferably, in a direction, as shown, that is countercurrent to the direction, as shown, of the flow of the gas mixture 224.

The relative pressure conditions within the conduit 208 and outside zone 232 are such as to promote the direction of the hydrogen flux to be from within the conduit 208 to the outside zone 232. Therefore, the partial pressure of the hydrogen gas within the conduit 208 is below the partial pressure of the hydrogen gas that is in the outside zone 232.

The following examples are provided to further illustrate the invention, but they are, however, not to be construed as limiting its scope.

EXAMPLE 1

This Example 1 illustrates the manufacture of a gas separation module by utilizing the inventive method that includes the removal of a substantial portion of the layer of a gas-selective material that has been deposited upon a porous support as a membrane layer of a gas separation module (system). The membrane layer of the gas separation module is formed by deposition of a porous layer of a first material that is abraded or polished followed by the deposition of a second layer of a palladium.

A gas separation module was manufactured using a method similar to the one described in detail in Example 2 of U.S. Patent Application Publication US 2004/0237780, which publication is incorporated herein by reference, followed by the further preparation of the gas separation module using the inventive method. The porous support used in the preparation of the gas separation module was a 2" OD×6" length duplex Inconel porous tube obtained from the Mott Corporation. The support tube was cleaned and oxidized in air at a temperature of 600° C. The oxidized support tube was then surface activated by immersing it in baths of $SnCl_2$ and $PdCl_2$. Porous thin layers of palladium and silver were sequentially deposited on the surface of the oxidized and surface activated support tube by an electroless plating method followed by abrading of the surface by hand using 600 grit dry sandpaper to provide a polished membrane. The polished membrane was finished by electrolessly depositing palladium using four plating cycles to provide a final gas separation module A made in accordance with the method described in the aforementioned US2004/0237780 and having a dense palladium membrane layer having a membrane thickness of 19 microns.

The gas separation module A with a dense palladium membrane layer thickness of 19 microns provides for a low hydrogen permeance and, thus, its use is not practical in many hydrogen purification applications. To correct this problem, the surface of the gas separation module A was then ground using a 60 grit aluminum oxide sandpaper until a target weight for the module was reached, which was approximately the weight of the module prior to the deposition of the dense palladium layer. Further sanding of the surface of the gas separation module A and removal of the membrane layer was conducted using successively finer grit aluminum oxide sandpapers following the grit progression of 60, 150, 1000, 1500, and 2000. The surface of the gas separation module A was then polished to a mirror-like finish using an ultra-fine abrasive polishing paste comprised of 0.3-micron alpha aluminum oxide particles to provide module A with its initial membrane layer having a substantial portion thereof removed therefrom by first using larger abrasive particles followed by the use of the fine abrasion particles to provide the membrane layer having a reduced membrane thickness. An overlayer of palladium was then applied to the membrane layer of module A by electrolessly plating it with palladium in two successive 90 minute plating baths.

The final gas separation module A had a dense, gas-selective palladium layer of 3.84 microns thickness.

EXAMPLE 2

This Example 2 illustrates the method of reconditioning a gas separation module or membrane system that has been placed in service and, then, subsequently developing a leak in its dense layer.

A composite gas separation module (module B) was prepared using a 1" OD×6" length duplex Inconel support provided by the Mott Corporation.

Module B was prepared by vacuum deposition of a palladium eggshell catalyst, provided by CRI Catalyst Company, on the duplex support. The eggshell catalyst consists of a material that is spray dried onto alpha alumina particles in such a manner that the material added is only found on the surface of the alpha alumina. A description of the palladium, i.e., noble metal, eggshell catalyst is presented in detail in the copending provisional patent application, filed Nov. 8, 2006 and having application No. 60/864,876, which is incorporated herein by reference. The layer of palladium eggshell catalyst was then plated with a layer of palladium until a dense membrane layer was formed. The completed module had a dense, gas selective, palladium layer of 5.08 microns thickness.

Module B was placed in service and, after some time in the reaction environment, a small leak developed. Module B was then removed from service and reconditioned by the following described method.

A substantial portion of the membrane layer on surface of module B was removed by abrasion with successively finer aluminum oxide sandpaper following the grit progression of 400, 600, 800, 1000, 1500, and 2000. The surface of module B was then polished to a mirror-like finish using an ultra-fine abrasive polishing paste comprised of 0.3-micron alpha alumina particles to provide module B with its membrane layer having a reduced membrane thickness below the thickness of membrane layer of the original module B. An overlayer of palladium was then applied to the membrane layer of module B by electrolessly plating it with palladium for 45 minutes and, then, annealing at 500° C. under a nitrogen atmosphere.

The final reconditioned module B had a dense, gas-selective, palladium layer of 4.4 microns thickness.

EXAMPLE 3

This Example 3 illustrates the method of reconditioning or repairing a gas separation module or membrane system that has been damaged during its manufacture so as to cause a leak in the dense layer of the membrane system.

Module C was made by the same method as described in Example 2, but during its production and after a gas dense membrane layer of 6 microns was formed, the membrane layer of module C was damaged resulting in a leak. Module C was then repaired by removing a substantial portion of the membrane layer by abrasion with successively finer aluminum oxide sandpaper following the grit progression of 1000, 1500, and 2000. The surface of module C was then polished to a mirror-like finish using an ultra-fine abrasive polishing paste comprised of 0.3-micron alpha alumina particles to provide module C with its membrane layer having a reduced membrane thickness below the thickness of membrane layer of the original module C. An overlayer of palladium was then applied to the membrane layer of module C by electrolessly plating it with palladium for 90 minutes and, then, annealing at 500° C. under a nitrogen atmosphere.

The final reconditioned module C had a dense, gas-selective, palladium layer of 7.2 microns thickness.

EXAMPLE 4

This Example 4 illustrates the method of reconditioning a gas separation module or membrane system that has been placed in service and, then, subsequently developing a leak in its membrane dense layer made by first depositing a metal powder on the surface of a porous substrate followed by the placement of an overlayer of palladium to form a dense layer.

Module D was prepared by applying to the surface of a 1" OD×6" length duplex Inconel porous support provided by the Mott Corporation a thin layer (less than 0.1 gram) of palladium and silver alloyed metal powder over which thin layer was electrolessly deposited a layer of palladium until a dense layer was formed. The thickness of the membrane layer was 11.3 microns.

Module D was placed in service and, after some time in the reaction environment, a small leak developed. Module D was then removed from service and reconditioned.

The defective module D was repaired by smoothing the surface with successively finer aluminum oxide sandpaper starting with a 180-grit sandpaper to remove a predetermined amount of palladium. Thereafter, a substantial portion of the membrane layer on the surface of module D was removed therefrom by abrasion with successively finer aluminum oxide sandpaper following the grit progression of 220, 400, 600, 800, 1000, 1500, and 2000. The surface of module D was then polished to a mirror-like finish using an ultra-fine abrasive polishing paste comprised of 0.3-micron alpha alumina particles to provide module D with its membrane layer having a reduced membrane thickness below the thickness of membrane layer of the original module D. An overlayer of palladium was then applied to the membrane layer of module D by electrolessly plating it with palladium for 90 minutes and, then, annealing at 500° C. under a nitrogen atmosphere.

The final reconditioned module D had a dense, gas-selective palladium layer of 6.26 microns thickness.

EXAMPLE 5

This Example 5 illustrates the manufacture of a gas separation membrane system by depositing an excessively thick membrane layer of a gas-selective material followed by the removal of a substantial portion of the membrane layer therefrom to thereby provide the membrane layer with a reduced membrane thickness, and, thereafter, depositing an overlayer of a second gas-selective material.

Module E was prepared by applying to the surface of a 1" OD×6" length INT-GRD-MC porous support provided by the Mott Corporation a thick layer (greater than 0.1 gram) of palladium and silver alloyed metal powder over which a layer of palladium was electrolessly deposited until a dense layer was formed. The thickness of the dense membrane layer of palladium was 15.16 microns.

The gas separation module E with a dense palladium membrane layer thickness of 15.16 microns provides for a low hydrogen permeance and, thus, its use is not practical in many hydrogen purification applications. To correct this problem, the surface of the dense palladium membrane layer was polished with successively finer aluminum oxide sandpaper starting with a 150-grit sandpaper to remove a predetermined amount of palladium therefrom. Thereafter, a substantial portion of the membrane layer on the surface of module E was removed therefrom by abrasion with successively finer aluminum oxide sandpaper following the grit progression of 220, 400, 600, 800, 1000, 1500, and 2000. The surface of module E was then polished to a mirror-like finish using an ultra-fine abrasive polishing paste comprised of 0.3-micron alpha alumina particles to provide module E with its membrane layer having a reduced membrane thickness below the thickness of membrane layer of the original module E. An overlayer of palladium was then applied to the membrane layer of module E by electrolessly plating it with palladium for 90 minutes and, then, annealing at 500° C. under a nitrogen atmosphere.

The final reconditioned module E had a dense, gas-selective palladium layer of 5.85 microns thickness.

EXAMPLE 6

This Example 6 illustrates the method of reconditioning a gas separation module prepared by one method described in the art and which has developed a leak in its dense layer after being placed in service.

A gas separation module was manufactured using a method similar to the one described in detail in Example 2 of U.S. Patent Application Publication US 2004/0237780, which publication is incorporated herein by reference. The porous support used in the preparation of the gas separation module was a 2" OD×6" length duplex Inconel porous tube obtained from the Mott Corporation. The support tube was cleaned and oxidized in air at a temperature of 600° C. The oxidized tube was then surface activated by immersing the oxidized tube in baths of $SnCl_2$ and $PdCl_2$. Porous thin layers of palladium and silver were sequentially deposited on the surface of the oxidized and surface activated porous tube by an electroless plating method followed by abrading of the surface by hand using 600 grit dry sandpaper to provide a polished membrane. The polished membrane was finished by electrolessly depositing palladium using four plating cycles to provide a final gas separation module F having a dense palladium membrane layer.

Module F was placed in service and, after some time in the reaction environment, a small leak developed. Module F was then removed from service and reconditioned by the following described method.

The damaged Module F was replated with a dense palladium layer of 14 microns thickness which provides for a low hydrogen permeance and, thus, making the replated Module F unsuitable for use in many hydrogen purification applications. To correct this problem, the surface of the gas separation module F was then ground using a 36-grit and a 60-grit aluminum oxide sandpaper until a target weight for the module was reached, which was approximately the weight of the module prior to the deposition of the dense palladium layer. Further sanding of the surface of the gas separation module F and removal of the membrane layer was conducted using successively finer grit aluminum oxide sandpapers following the grit progression of 60, 150, 1000, 1500, and 2000. The surface of the gas separation module F was then polished to a mirror-like finish using an ultra-fine abrasive polishing paste comprised of 0.3-micron alpha aluminum oxide particles to provide module F with its initial membrane layer having a substantial portion thereof removed therefrom using the fine abrasion particles to provide the membrane layer having a reduced membrane thickness. An overlayer of palladium was then applied to the membrane layer of module F by electrolessly plating it with palladium in two successive 90 minute plating baths.

The final gas separation module F had a dense, gas-selective palladium layer of 1.09 microns thickness.

EXAMPLE 7

This Example 7 describes the testing method for determining whether or not the particular gas separation module is leak-proof or not and for measuring the leakage rate of the defective gas separation modules.

Figure 3:
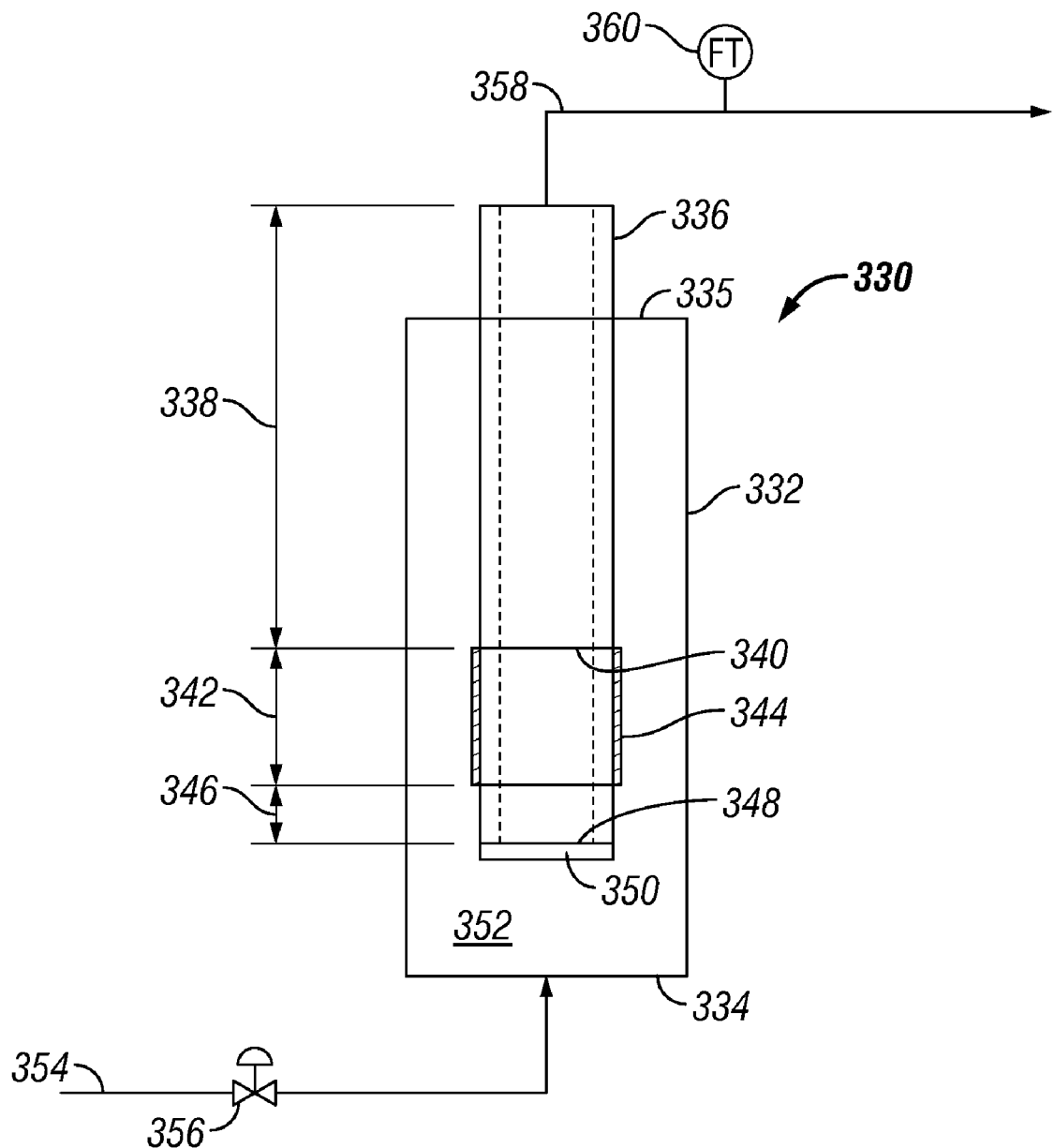
FIG. 3 is a simplified schematic of the set-up of the leak testing of various gas separation membrane modules made in accordance with certain of the methods of the invention.

The nitrogen leak rate of the various membrane Modules A through F having the original dense palladium layer and such modules having the final dense palladium layer were each tested using a testing device as depicted in the schematic of FIG. 3. A nitrogen flux column 330 was used in the measurements of the nitrogen leak rates of the modules. The nitrogen flux column 330 comprised a plexiglass tube 332, having a plexiglass bottom seal cap 334, and a top portion 335 consisting of a screw-on top (not depicted) capable of being secured onto and removed from the top of the nitrogen flux column 330. The screw-on top was provided with an opening and was operatively equipped with a swagelock fitting (not depicted) that in combination allowed for the insertion of a tubular member or pipe 336 through the opening and the securing of the tubular member 336 in place. The tubular member 336 included a length of pipe 338 made of a dense (non-porous) metal, wherein at its end 340 was affixed with a gas-tight seal the module 342. Shown on the outside surface of the module 342 was the palladium layer 344. At the bottom of module 342 was another length of pipe 346 made of a dense (non-porous) metal, which at its bottom end 348 was affixed with a gas-tight seal a cap 350. Nitrogen gas was supplied to the inside 352 of the nitrogen flux column 330 by way of conduit 354, which was also equipped with a pressure regulator 356 for controlling the nitrogen pressure within the inside 352 at the desired pressure of about 15 pounds per square inch gauge pressure. Conduit 358 was operatively connected to the tubular member 336 and provided for the removal of nitrogen gas and the measurement of its rate of flow that was leaked through the particular module 342 that was being tested. Operatively connected to conduit 358 was a flow measuring means 360 for measuring the rate of gas flow through conduit 358.

TABLE 1

Membrane thicknesses of gas separation modules prior to abrasion thereof and after the abrasion and deposition of a palladium overlayer

| Module | Original Dense Pd Layer Thickness (μm) | Leak Rate (sccm) | Final Dense Pd Layer Thickness (μm) | Leak Rate (sccm) |
|---|---|---|---|---|
| A | 19 | 15 | 3.84 | 0 |
| B | 5.08 | 14 | 4.4 | 0 |
| C | 6 | 1.6 | 7.2 | 0 |
| D | 11.3 | 9.7 | 6.26 | 0 |
| E | 15.16 | 1.5 | 5.85 | 0 |
| F | 14 | 110 | 1.09 | 1 |

The data presented in Table 1 demonstrate some of the many advantages provided by the inventive method of manufacturing a membrane system and the membrane system itself. For all of the modules (A through F), the final dense palladium layer thickness is significantly smaller than 10 μm, and, for all but one of the modules, the final dense palladium layer thickness was significantly smaller than the original dense palladium layer of the given module. Even with the extremely small final dense palladium layer thickness, the manufacturing method was able to provide a membrane system having a membrane layer that is essentially leak free. The method provides for a membrane system having a dense (gas-tight) membrane of a thickness that is significantly reduced, which thereby provides for lower material costs in its manufacture. Moreover, the above data also demonstrate the ability to recondition or repair already manufactured membrane systems that have been damaged or are or have become defective. This ability to repair or recondition already manufactured membrane systems provides significant economic advantages by eliminating the need to use new materials to make a membrane system.

The invention claimed is:

1. A method of preparing or reconditioning a gas separation membrane system, wherein said method comprises:

providing a porous support upon which is supported a membrane layer comprising a first gas-selective material said membrane layer having a membrane thickness in the range from 1 μm to 50 μm;

removing a substantial portion of said first gas-selective material from said membrane layer by the use of an ultra-fine abrasive of abrading particles no larger than in the range of from 0.01 μm to 3 μm to thereby provide said membrane layer having a reduced membrane thickness; and depositing upon said membrane layer having said reduced membrane thickness an overlayer comprising a second gas-selective material and having an overlayer thickness so as to thereby provide a gas tight, gas separation membrane system having said membrane layer of said reduced membrane thickness and of said overlayer of said overlayer thickness wherein the sum of said overlayer thickness and said reduced membrane thickness is in the range of from 0.001 μm to 9.9 μm, wherein said membrane thickness prior to removing said substantial portion thereof is greater than 80 percent of the sum of said reduced membrane thickness and said overlayer thickness.

2. A method as recited in claim 1, wherein the sum of said reduced membrane thickness and said overlayer thickness is less than said membrane thickness prior to said removal step.

3. A method as recited in claim 2, wherein said substantial portion of said first gas-selective material removed from said membrane layer is such that said reduced membrane thickness is in the range of from 1 to 90 percent of said membrane thickness.

4. A method as recited in claim 3, wherein said ultra-fine abrasive includes abrading particles no larger than in the range of from 0.01 μm to 2 μm.

5. A method as recited in claim 4, wherein said substantial portion of said first gas-selective material removed from said membrane layer is such that said reduced membrane thickness is in the range of from 20 to 90 percent of said membrane thickness.

6. A method as recited in claim 5, wherein the sum of said overlayer thickness and said reduced membrane thickness is in the range of from 0.01 μm to 9.5 μm.

7. A method as recited in claim 1, wherein said abrading particles of said ultra-fine are no larger than in the range of from 0.01 μm to 1 μm.

8. A method as recited in claim 7, wherein the sum of said overlayer thickness and said reduced membrane thickness is in the range of from 0.1 μm to 9 μm.

9. A method as recited in claim 8, wherein the sum of said overlayer thickness and said reduced membrane thickness is less than said membrane thickness prior to said removal step.

10. A method as recited in claim 3, wherein said abrading particles of said ultra-fine are no larger than in the range of from 0.01 μm to 1 μm.

11. A method as recited in claim 10, wherein the sum of said overlayer thickness and said reduced membrane thickness is in the range of from 0.1 μm to 9 μm.

12. A process for separating hydrogen from a hydrogen-containing gas stream, wherein said process comprises:

passing said hydrogen-containing gas stream over a gas tight, gas separation membrane system, comprising a porous support upon which is supported a membrane layer of a first gas-selective material said membrane layer having a membrane thickness in the range from 1 μm to 50 μm with a substantial portion of said membrane layer of said first gas-selective material having been removed therefrom by the use of an ultra-fine abrasive of abrading particles no larger than in the range of from 0.01 μm to 3 μm to thereby provide said membrane layer having a reduced membrane thickness, wherein said membrane layer is overlaid with an overlayer of a second gas-selective material, and wherein said overlayer has an overlayer thickness, wherein the sum of said overlayer thickness and said reduced membrane thickness is in the range of from 0.001 μm to 9.9 μm, wherein said membrane thickness prior to removing said substantial portion thereof is greater than 80 percent of the sum of said reduced membrane thickness and said overlayer thickness, under temperature and pressure conditions such that hydrogen from said hydrogen-containing gas stream selectively passes through said gas separation membrane system; and recovering the thus separated hydrogen.

13. A process for separating hydrogen from a hydrogen-containing gas stream as recited in claim 12, wherein the sum of said reduced membrane thickness and said overlayer thickness is less than said membrane thickness prior to said removal step.

14. A process for separating hydrogen from a hydrogen-containing gas stream as recited in claim 13, wherein said substantial portion of said first gas-selective material removed from said membrane layer is such that said reduced membrane thickness is in the range of from 1 to 90 percent of said membrane thickness.

15. A process for separating hydrogen from a hydrogen-containing gas stream as recited in claim 14, wherein said ultra-fine abrasive includes abrading particles no larger than in the range of from 0.01 μm to 2 μm.

16. A process for separating hydrogen from a hydrogen-containing gas stream as recited in claim 15, wherein said membrane thickness prior to said removing step is in the range of from 1 μm to 50 μm.

17. A process for separating hydrogen from a hydrogen-containing gas stream as recited in claim 16, wherein said the sum of said overlayer thickness and said reduced membrane thickness is in the range of from 0.01 μm to 9.5 μm.

18. A process for separating hydrogen from a hydrogen-containing gas stream as recited in claim 12, wherein said abrading particles of said ultra-fine are no larger than in the range of from 0.01 μm to 1 μm.

19. A process for separating hydrogen from a hydrogen-containing gas stream as recited in claim 18, wherein the sum of said overlayer thickness and said reduced membrane thickness is in the range of from 0.1 μm to 9 μm.

20. A process for separating hydrogen from a hydrogen-containing gas stream as recited in claim 19, wherein the sum of said overlayer thickness and said reduced membrane thickness is less than said membrane thickness prior to said removal step.

21. A process for separating hydrogen from a hydrogen-containing gas stream as recited in claim 14, wherein said abrading particles of said ultra-fine are no larger than in the range of from 0.01 μm to 1 μm.

22. A process for separating hydrogen from a hydrogen-containing gas stream as recited in claim 21, wherein the sum of said overlayer thickness and said reduced membrane thickness is in the range of from 0.1 μm to 9 μm.

* * * * *